(12) United States Patent
Jones

(10) Patent No.: US 6,398,472 B1
(45) Date of Patent: Jun. 4, 2002

(54) BLIND RIVET ASSEMBLY WITH LOCALIZED ATTACHMENT AND METHODS OF ASSEMBLING

(75) Inventor: Steven V. Jones, Birmingham (GB)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/517,143

(22) Filed: Mar. 2, 2000

(30) Foreign Application Priority Data

Mar. 3, 1999 (GB) .............................................. 9904834

(51) Int. Cl.⁷ ................................................ F16B 13/04
(52) U.S. Cl. .............................. 411/34; 411/43; 411/45
(58) Field of Search .............................. 411/34–38, 43, 411/45

(56) References Cited

U.S. PATENT DOCUMENTS

| 2,038,189 A | * | 4/1936 | Morris |  |
|---|---|---|---|---|
| 2,282,711 A | * | 5/1942 | Eklund |  |
| 2,409,352 A | * | 10/1946 | Gill |  |
| 4,036,098 A | * | 7/1977 | Schruff | 411/34 |
| 4,182,216 A | * | 1/1980 | DeCaro | 411/34 |
| 4,478,543 A |  | 10/1984 | Lyon |  |
| 4,875,815 A | * | 10/1989 | Phillips | 411/38 |
| 5,248,231 A | * | 9/1993 | Denham | 411/43 |
| 5,685,680 A | * | 11/1997 | Duffy | 411/171 |

FOREIGN PATENT DOCUMENTS

| GB | 1178655 | 1/1970 |
| GB | 2151738 | 7/1985 |
| GB | 2231378 | 11/1990 |

* cited by examiner

Primary Examiner—Flemming Saether
(74) Attorney, Agent, or Firm—Edward D. Murphy (57) ABSTRACT

A blind rivet assembly 10 includes a mandrel 2 and a rivet body 4. The mandrel 2 has a head portion 6 and a shank portion 8. The rivet body 4 has a generally cylindrical body portion 12 terminating in a flange 14 at a first end, and a free end 16 at the other end of the body portion 12. The mandrel 2 is assembled into the rivet body 4 so that the free end 16 of the body portion 12 contacts the underside 18 of the head portion 6. The free end 16 of the body portion 12 is attached to the underside 18 of the head portion 6 of the mandrel 2.

7 Claims, 7 Drawing Sheets

BLIND RIVET ASSEMBLY WITH LOCALIZED ATTACHMENT AND METHODS OF ASSEMBLING

BACKGROUND OF THE INVENTION

The present invention relates to a blind rivet assembly with localized attachment and methods of assembling, and particularly to a multiple part blind rivet assembly with localized attachment points, and further relates to a method of assembling multiple parts of a blind rivet assembly.

Blind rivets normally comprise two parts, a mandrel and a body. The mandrel and body are assembled together, and inserted into a hole in a workpiece from the operator's side. By applying a suitable setting tool, the mandrel is pulled and, by pulling the mandrel the rivet body is upset on the side remote from the operator, thus securing the joint. For pull system blind rivets during the process of setting the rivet the mandrel head enters the rivet body and expands the rivet body by virtue of the mandrel head distending the outer diameter. The mandrel continues to be progressively pulled through the rivet body until it meets resistance on the blind side of the workpiece at which point the mandrel ruptures at a predetermined break load. Although the mandrel is held in the rivet body before setting, once set the retained part of the mandrel can be removed, using varying degrees of force depending upon the design of the rivet. Moreover, it is sometimes the case that, after setting, the mandrel part is free to move within the rivet body without needing force to dislodge it from its setting position. The end users of rivets need to be confident that the mandrel will remain in the rivet body, and will not move to cause noise problems or fall into the assembled workpiece.

SUMMARY OF THE INVENTION

It is an object of the present invention to provide a blind rivet in which the above disadvantages are reduced or substantially obviated, which rivet additionally demonstrates improved setting characteristics. It is a further object of the present invention to provide an improved method of assembling a blind rivet.

The present invention provides a blind rivet assembly which comprises a mandrel and a rivet body, the mandrel comprising a head portion and a shank portion and the rivet body comprising a generally cylindrical body portion terminating in a flange at a first end thereof and a free end at the other end thereof, the mandrel being assembled into the rivet body so that the free end of the body portion of the rivet body contacts the underside of the head portion of the mandrel characterized in that the free end of the body portion of the rivet body is attached to the underside of the head portion of the mandrel.

In one realization of the present invention, the free end of the body is friction welded to the underside of the head portion of the mandrel.

One of the benefits of using friction welding is that the process facilitates the joining of materials that are difficult to weld resulting in a rivet body and mandrel joined without further finishing necessary.

One beneficial aspect of the rivet according to the present invention which is formed by friction welding is that the rivet body and the mandrel each have features formed on the outer surfaces to facilitate rotation in a special machine. The rivet body and the mandrel can be easily rotated in opposite directions.

With the friction welding process there is generated displaced material from the interface of the rivet body and the mandrel. It is desirable to keep this displaced material within the profile of the rivet envelope and therefore ideally a space is provided to accommodate this excess material.

The present invention further provides a first method of assembling a rivet assembly, wherein, before assembly, the mandrel has, beneath its head portion, one or more projections, and the method of assembling the rivet assembly includes the steps of discharging an electrical current between the rivet body and the projections on the mandrel, causing both the free end of the rivet body, and the projections to melt, switching off the current, and pressing the head portion of the mandrel towards the free end of the rivet body.

During the setting process the rivet is applied in the normal manner but, since the mandrel head is attached to the end of the rivet body, the mandrel head does not enter the rivet body as the mandrel is pulled. The setting characteristics of the rivet change in that the rivet body is subjected to a compressive load and the rivet body expands radially outwards on the blind side of the workpiece; the resulting bulge being greater in diameter than if the mandrel head were pulled into the rivet body. Thus the set rivet will have greater tensile strength.

The present invention further provides a second method of assembling a rivet assembly according to the present invention where the free end of the body portion of rivet body is friction welded to the underside of the head portion comprising the steps of locating the mandrel within the rivet body so that the bottom section locates with the recess and at least part of the wall of the recess is in contact with part of the surface of the bottom section, rotating the mandrel in relation to the rivet body to generate heat due to friction between the wall of the recess and the surface of the bottom section and, when the interface material is molten, pressing the head portion of the mandrel towards the free end of the rivet body whilst holding the mandrel and rivet body stationary until the interface material cools.

Other objects, features and advantages of the present invention will become more fully apparent from the following detailed description of the preferred embodiment, the appended claims and the accompanying drawings.

BRIEF DESCRIPTION OF THE DRAWINGS

Five embodiments of a rivet assembly according to the present invention will now be described with reference to the accompanying drawings, in which.

DESCRIPTION OF THE PREFERRED EMBODIMENT

Three embodiments of the present invention are described below with reference to FIGS. 1 through 6.

Figure 1:
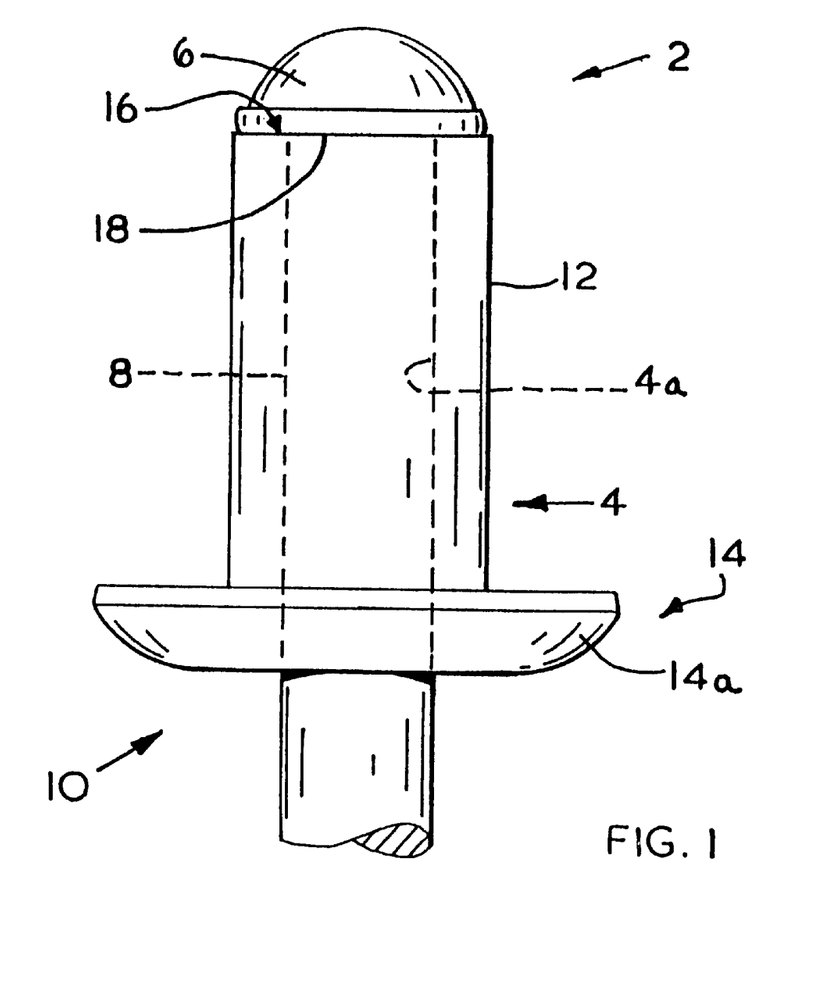
FIG. 1 is a view of a rivet assembly according to the present invention.

As shown in FIG. 1 a rivet assembly 10 includes a metallic mandrel 2 and a metallic rivet body 4. The mandrel 2 is formed with a head portion 6 and a shank portion 8. The rivet body 4 is formed with a generally cylindrical body portion 12 terminating in a flange 14 at one end of the body portion and a free end 16 at the other end thereof. The shank portion 8 of the mandrel 2 is inserted into a bore 4a, which extends through the length of the rivet body 4, so that the free end 16 of the body portion 12 of the rivet body 4 contacts the underside 18 of the head portion 6 of the mandrel 2. The underside 18 of the head portion 6 is joined to the free end 16 of the body portion 12.

Figure 2:
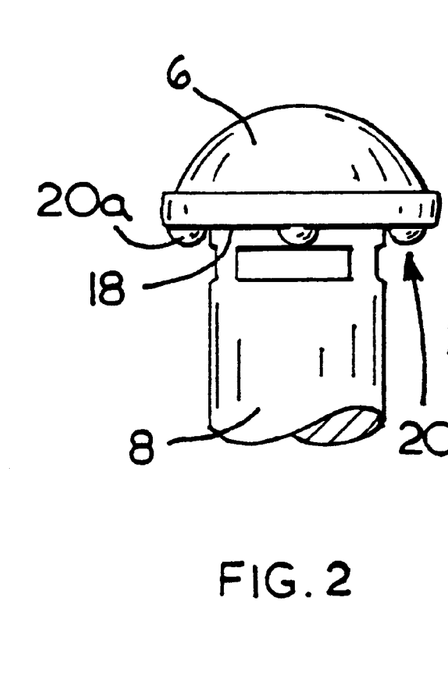
FIG. 2 is a view of a mandrel of the first embodiment of the rivet.
Figure 3:
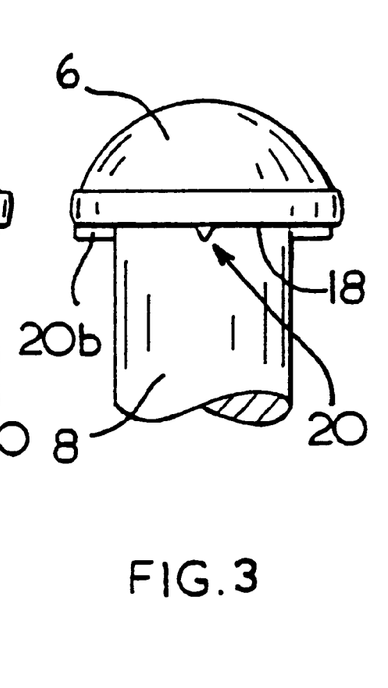
FIG. 3 is a view of a mandrel of the second embodiment of the rivet.
Figure 4:
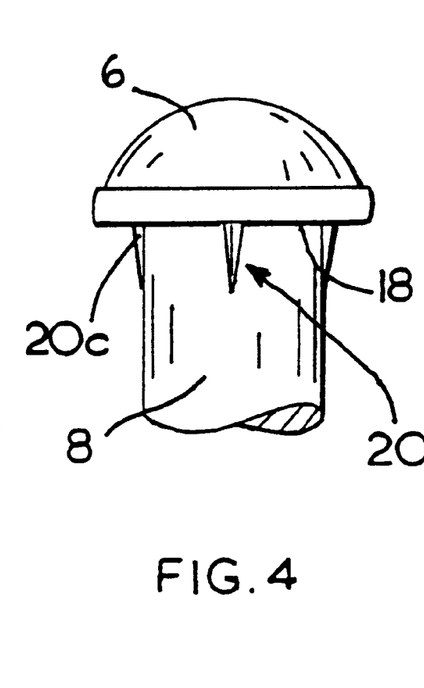
FIG. 4 is a view of a mandrel of the third embodiments of the rivet.

As can be seen from FIGS. 2, 3 and 4, the mandrel 2 is provided with one or more projections (20) beneath its head portion (6). As shown in FIGS. 2 and 3 the projections 20 may for example be in the form of semi-spherical protrusions 20a or wedge shaped protrusions 20b which extend from the underside 18 of the head portion 6 of the mandrel 2. Alternatively, The projections are preferably equi-spaced around the circumference of the mandrel 2. A method of assembling the rivet assembly 10, according to the present invention, includes the steps of passing an electrical current between the rivet body 4 and the projections 20 on the mandrel 2, causing both the free end 16 of the rivet body 4 and the projections to melt to a molten state. The current is removed and the head portion 6 of the mandrel 2 is pressed towards the free end 16 of the rivet body 4.

The passing of electrical current and the localized melting of the free end 16 of the body 4 and the projections 20 of the head portion 6 only exist for a few milliseconds, before the current is removed. As the head 6 of the mandrel 2 is pressed towards the free end 16 of the rivet body 4, the molten metal solidifies and thereby causes the head 6 of the mandrel 2 and the rivet body 4 to be permanently joined.

Figure 5:
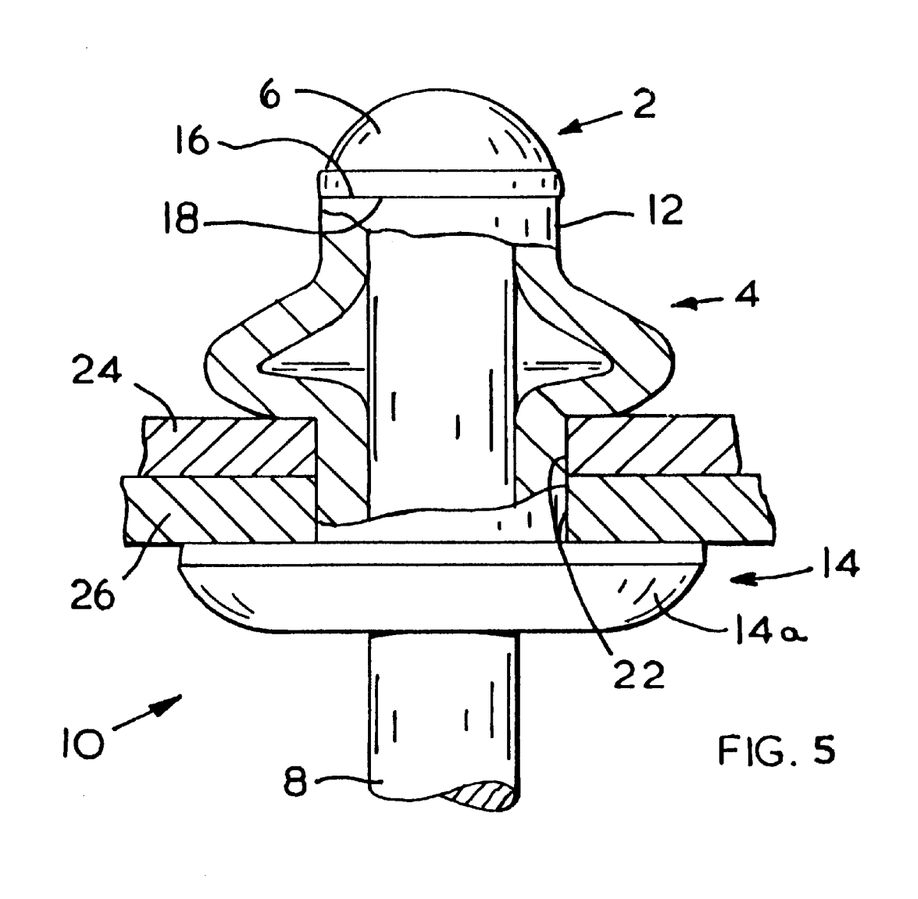
FIG. 5 is a view of the rivet assembly of FIG. 1 after setting.

Referring to FIG. 5, a setting process, the rivet assembly 10 is inserted from the operator side of aligned apertures 22 formed in two workpieces 24,26 which are to be fastened together by means of the rivet assembly 10.

A suitable setting tool (not shown) is applied to exposed surface 14a of the flange 14 and the shank portion 8 of the mandrel 8 is pulled in the direction of the arrow (FIG. 5).

When the rivet assembly 10 is set, as shown in FIG. 5, there is no tendency for the mandrel head portion 6 to be pulled into the rivet body 4 and instead a controlled blind side bulge is produced just before the shank portion 8 of the mandrel 2 breaks.

Figure 6:
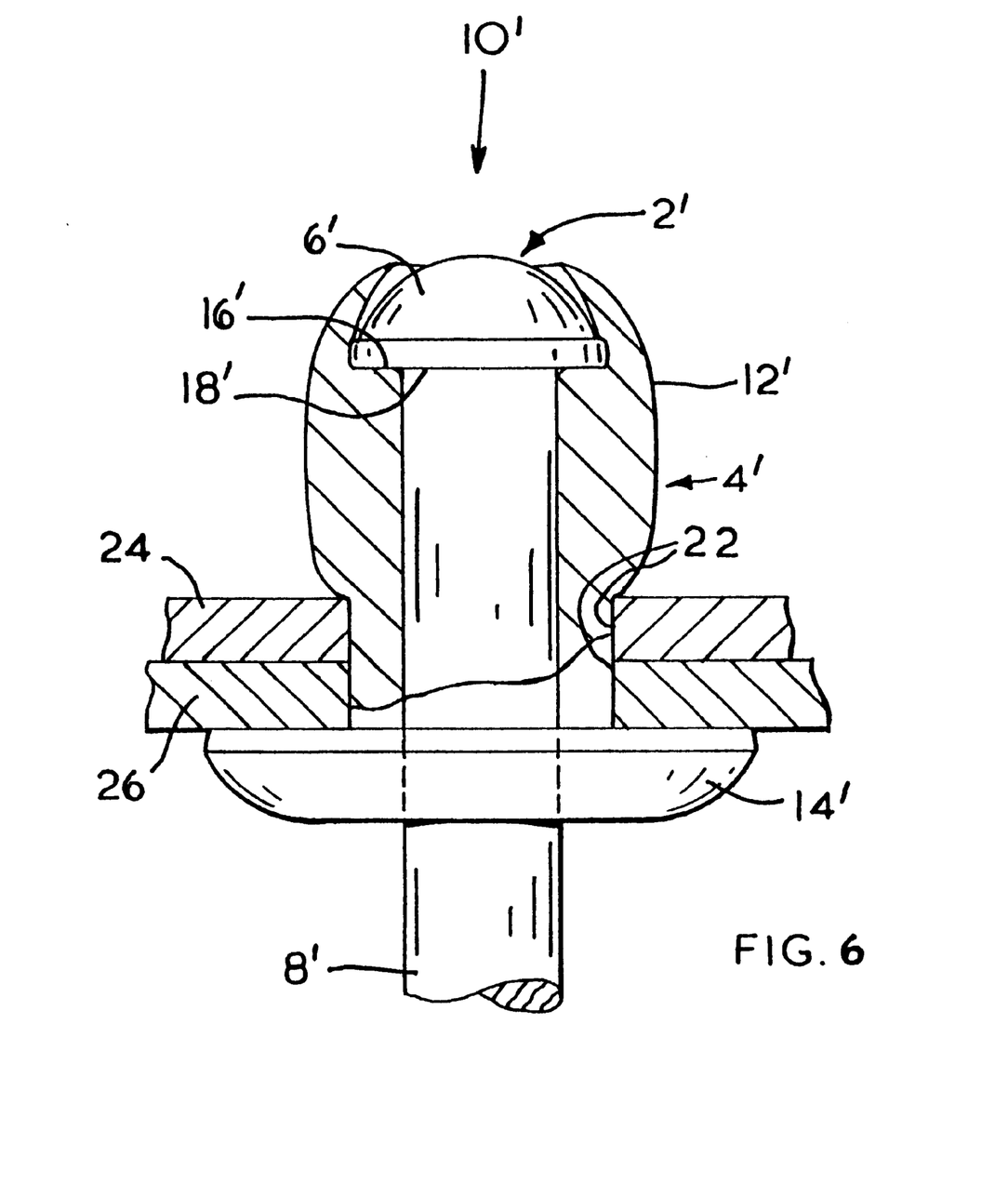
FIG. 6 is a view of a conventional rivet assembly after setting.

In contrast to this, as shown in FIG. 6, when a conventional blind rivet assembly 10' is set, there is a tendency for the mandrel head 6' to be pulled into the rivet body 4 just before the shank portion 8' of the mandrel 2' breaks.

In a fourth embodiment of the invention as shown in FIGS. 7 through 10, a rivet assembly 10" includes a mandrel 50 and a rivet body 52. The mandrel 50 comprises a head portion 54 and a shank 58. A break neck 56 is formed on the shank 58 in close proximity to the head portion 54. The rivet body 52 comprises a generally cylindrical body portion 60 terminating in a flange 62 at one. end of the body portion 60. A bore 64 extends through the length of the body portion 60. When the shank 58 of the mandrel 50 is mounted within the bore 64 of the body 52, the mandrel head portion 54 abuts against a free end 55 of the body portion 60 at the opposite end to the flange 62, with the shank 58 extending through, and from, the bore 64 of the rivet body 52.

Figures 8, 9, 10:
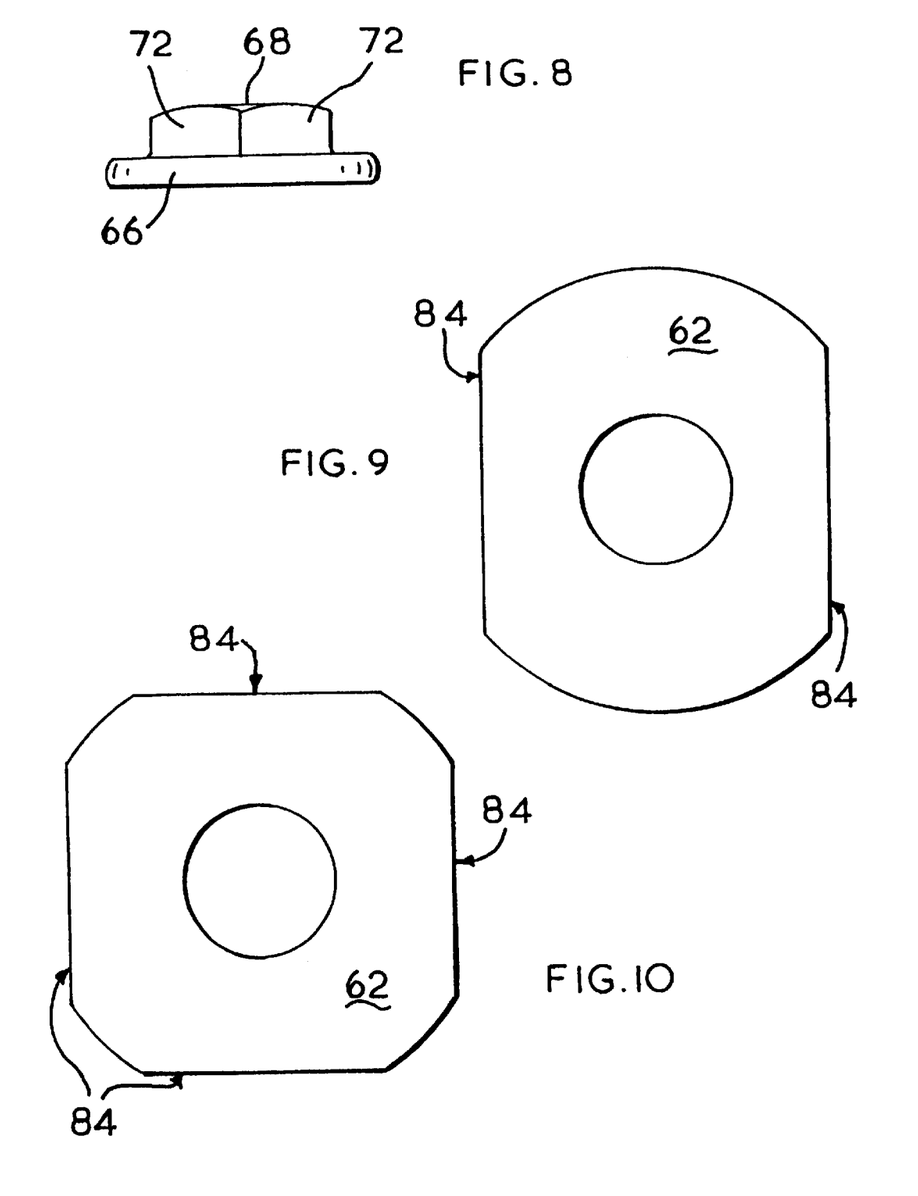
FIG. 8 shows an alternative design of the top part of the mandrel head.
FIG. 9 shows a cross-sectional shape of the flange of the rivet body indicated by line X—X in FIG. 7.
FIG. 10 an alternative cross-sectional shape of the flange of the rivet body indicated by the line X—X in FIG. 7.

The mandrel head portion 54 is formed in three sections along the longitudinal axis of the mandrel 50. A middle section 66 of the head portion 54 is formed in the shape of a circular disk of uniform thickness axially aligned with the longitudinal axis of the mandrel 50. A top section 68 of the head portion 54, immediately adjacent the middle section 66, is a disk formed with six flats (70) so that the shape of the cross section is substantially hexagonal, in a similar manner to that of a head of a bolt. Alternatively, the top section 68'is formed with four flats 72 as shown in FIG. 8 so that the cross-section is substantially square. A bottom section 74 of the head portion 54 is formed in the shape of a circular disk of uniform thickness axially aligned with longitudinal axis of the mandrel 50 in the same manner as the middle section 66. However, the diameter of the bottom section 74 is less than that of the middle section 66.

A circular recess 76 of uniform depth is formed in the free end 55 of the body 52 opposite to the end forming the flange 62. The recess 76 is intended to receive the bottom section 74 of the mandrel head portion 54 when the rivet assembly 10'is assembled. The recess 76 is axially aligned with the bore 64 of the rivet body 52. The diameter of the recess 76 is greater than that of the bottom section 74 of the mandrel head portion 54 but less than that of the middle section 66. The depth of the recess 76 is very slightly less than or the same as the thickness of the bottom section 74 so that, when the mandrel 50 is located with the rivet body 52, a lower surface 78 of the bottom section 74 is in contact with an end surface 80 of the recess. When the mandrel 50 is located within the rivet body 52, as shown in FIG. 7, an annular recess 82 is formed between the lower surface 78 of the bottom section 74 and the inner side wall of the recess 76.

The flange 62 is formed with two flats 84 along opposite sides of the flange as shown in FIG. 9. Alternatively, the flange 62 may be formed with four flats 84 as shown in FIG. 10.

Figure 7:
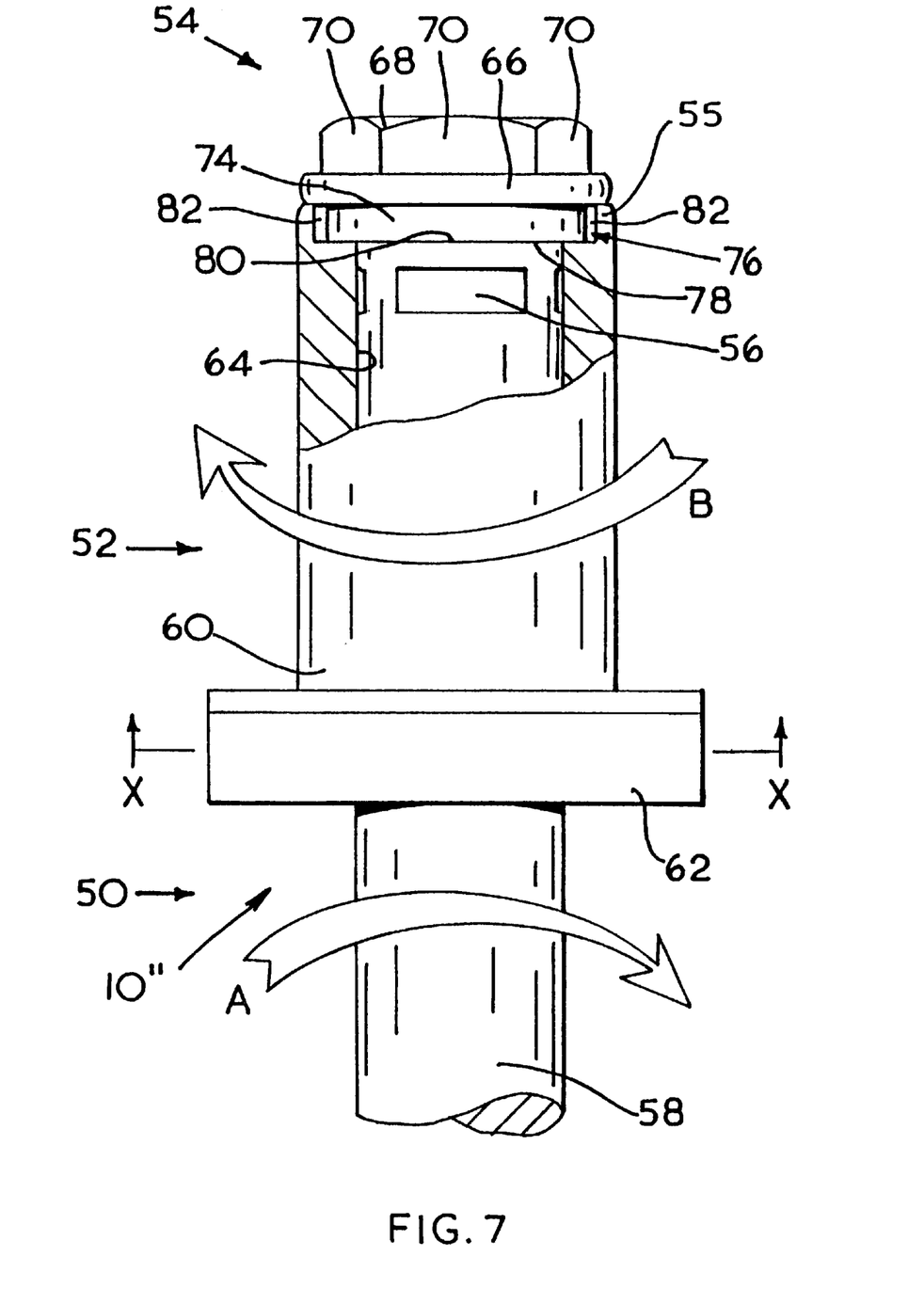
FIG. 7 shows a side view of the fourth embodiment of the rivet assembly during assembly with part of the cylindrical body cut away to show the mandrel head.

In the completed rivet assembly 10' as shown in FIG. 7, the underside of the mandrel head portion 54 is friction welded to the end of the rivet body 52. This is achieved during production by using a friction welding machine (not shown) which couples with the top section 68 of the mandrel head portion 54 and the flange 62 on the rivet body 52. The flats 70 and 84 on the mandrel head portion 54 and the flange 62, respectively, enable the machine to easily grip the mandrel 50 and the flange 62. The machine rotates the mandrel 50 in a first direction (indicated by the Arrow A) and the rivet body 52 in a second opposite direction (indicated by the Arrow B). As the mandrel 50 and the rivet body 52 rotate in different directions relative to each other, the lower surface 78 of the bottom section 74 rubs against the end surface 80 of the recess 76. Due to the friction between the two surfaces 78 and 80, heat is generated. When the heat is at a sufficient temperature, the materials, which form the lower surface 78 of the bottom section 74 and the end surface 80 of the recess 76, melt. The mandrel head portion 54 and the cylindrical body portion 60 of the rivet body 52 are then urged together by the friction welding machine and held stationary whilst the molten interface cools and solidifies. The relative rotation of the mandrel 50 and the rivet body 52 can be stopped either before or during the process of urging the cylindrical body portion 60 and the mandrel head portion 54 together. During this process, some of the molten interface material is displaced into the annular recess 82 before cooling. Once the interface material has solidified, the mandrel head portion 54 is friction welded to the rivet body 52 in accordance with the present invention.

Figure 11:
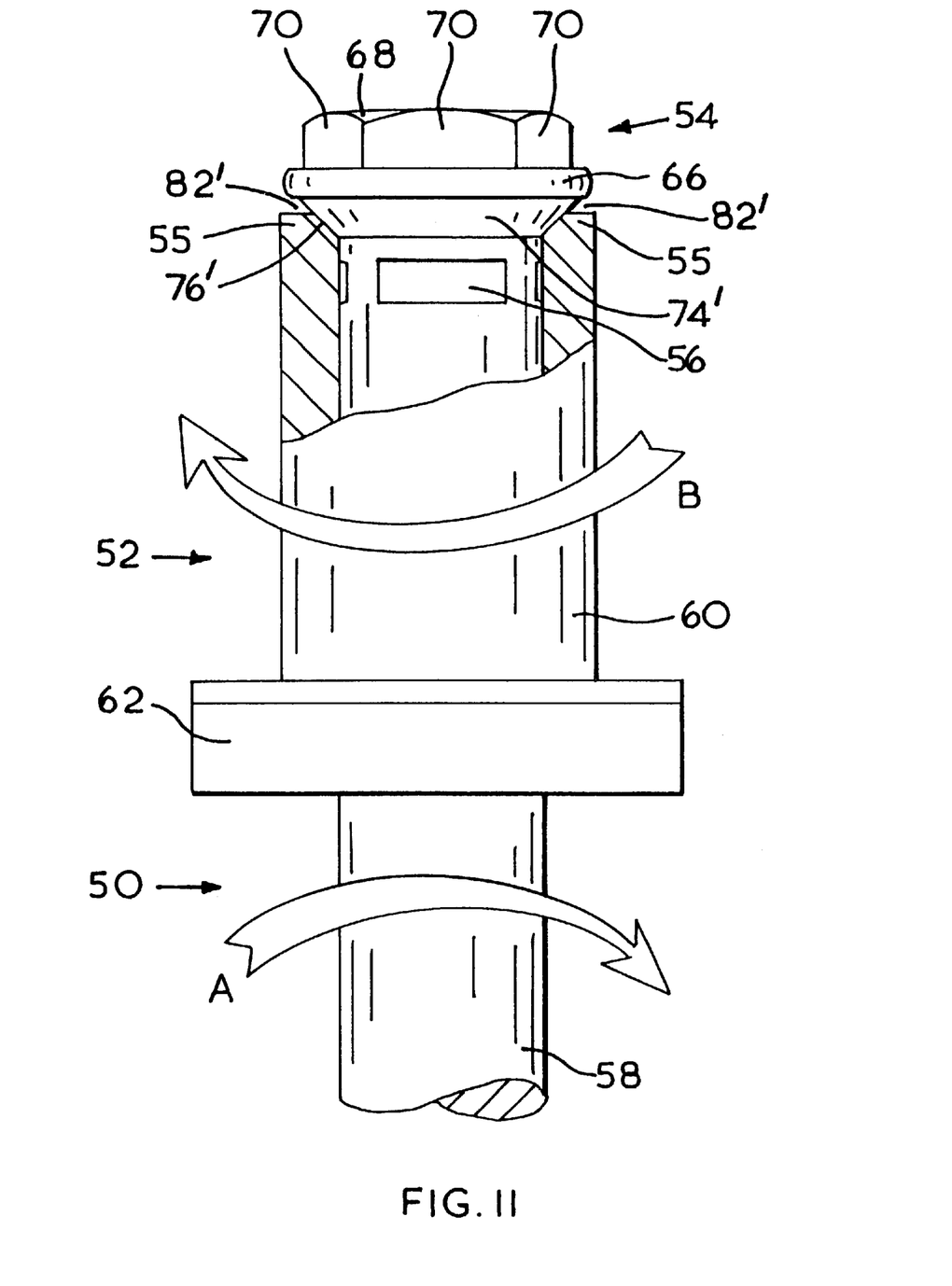
FIG. 11 shows a side view of the fifth embodiment of the rivet assembly during assembly with part of the cylindrical body cut away to show the mandrel head.

Referring to FIG. 11, the fifth embodiment of the present invention is the same as the fourth embodiment except for the shape of the bottom section 74', the recess 76'. and the location of the annular space 82' for the flow of molten interface materials. As can be seen from FIG. 11, the bottom section 74' is frusto conical, being tapered from a larger diameter at the top next to the middle section 66 to the diameter of the shank 58 of the mandrel 50. The diameter of the top section 68 is less than that of the middle section 66. The recess 76' is similarly tapered and dimensioned so that it is capable of mating with the bottom section 74'. The annular space 82'is formed between the underside of the middle section 66 and the free end of the rivet body 52. The mandrel head portion 54 is friction welded to the rivet body 52 in the same manner as described with respect to the fourth embodiment. When the mandrel head portion 54 is rotated in one direction (Arrow A) and the rivet body 52 in the other direction (Arrow B), the friction between the tapered outer surface of the bottom section 74' and the tapered surface of the recess 76' rubbing together generates heat, causing the material at the interface between the surfaces to melt. The mandrel head portion 54 is then urged towards the cylindrical body portion 60 of the rivet body 52 and held stationary until the interface material solidifies. Some of the molten interface material is displaced into the annular space 82' during this process.

In general, the above-identified embodiments are not to be construed as limiting the breadth of the present invention. Modifications, and other alternative constructions, will be apparent which are within the spirit and scope of the invention as defined in the appended claims.

What is claimed is:

1. A blind rivet assembly (10) comprises a mandrel (2) and a rivet body (4), the mandrel (2) comprising a head portion (6) and a shank portion (8) and the rivet body (4) comprising a generally cylindrical body portion (12) terminating in a flange (14) at a first end thereof and a free end (16) at the other end thereof, the mandrel (2) being assembled into the rivet body (4) so that the free end (16) of the body portion (12) of the rivet body (4) is positioned adjacent an underside (18) of the head portion (6) of the mandrel (2), characterized in that spaced portions of the free end (16) of the body portion (12) of the rivet body (4) are in contact with and welded to corresponding spaced portions (20) of the underside (18) of the head portion (6) of the mandrel (2) at spaced localized points of contact only.

2. The blind rivet assembly as claimed in claim 1, wherein the mandrel has, beneath its head portion, the spaced portions of the underside of the head portion in the form of two or more projections (20) which form spaced weld points to the rivet body.

3. The blind rivet assembly as claimed in claim 2, wherein the projections (20) are in the form of protrusions (20a, 20b) which extend from the underside (18) of the head portion (6) of the mandrel (2).

4. The blind rivet assembly as claimed in claim 3, wherein the projections (20) are in the form of axial splines (20c) which project from the shank portion (8) of the mandrel (2), adjacent to the underside (18) of the head portion (6) of the mandrel (2).

5. A method of assembling a blind rivet assembly as claimed in claim 1, characterized in that, before assembly, the mandrel (2) has, at spaced locations beneath its head portion (6), two or more spaced projections (20), and the method of assembling the rivet assembly (10) includes the steps of passing an electrical current between the rivet body (4) and the projections (20) on the mandrel, causing both the free end (16) of the rivet body (4), and the projections (20) to melt, switching off the current, and pressing the head portion (6) of the mandrel (2) towards the free end (16) of the rivet body (4).

6. The method of assembling a rivet assembly (10) as claimed in claim 5, characterized in that the spaced projections (20) are in the form of protrusions (20a, 20b) which extend at the spaced locations from the underside (18) of the head portion (6) of the mandrel (2).

7. The method of assembling a rivet assembly (10) as claimed in claim 5, characterized in that the spaced projections (20) are in the form of axial splines (20c) which project from the shank portion (8) of the mandrel (2), adjacent to the underside (18) of the head portion (6) of the mandrel, (2).

* * * * *